(12) United States Patent
Kok et al.

(10) Patent No.: US 9,735,673 B2
(45) Date of Patent: Aug. 15, 2017

(54) BURST-MODE OPERATION OF A SWITCHING CONVERTER

(75) Inventors: Siu Kam Kok, Sims Ville (SG); Mingping Mao, Singapore (SG); Xiaowu Gong, Singapore (SG)

(73) Assignee: Infineon Technologies AG, Neubiberg (DE)

(*) Notice: Subject to any disclaimer, the term of this patent is extended or adjusted under 35 U.S.C. 154(b) by 403 days.

(21) Appl. No.: 13/076,140

(22) Filed: Mar. 30, 2011

(65) Prior Publication Data

US 2012/0250378 A1 Oct. 4, 2012

(51) Int. Cl.
*H02M 3/156* (2006.01)
*H02M 3/335* (2006.01)
*H02M 1/00* (2006.01)

(52) U.S. Cl.
CPC ....... *H02M 3/156* (2013.01); *H02M 3/33507* (2013.01); *H02M 2001/0035* (2013.01); *Y02B 70/16* (2013.01)

(58) Field of Classification Search
CPC ..... H02M 3/33507; H02M 2001/0035; H02M 3/33515; H02M 3/335; H02M 3/156; H02M 2001/0032; H02M 3/158; H02M 3/157; H02M 3/33523; Y02B 70/16; Y02B 70/1433; Y02B 70/1475; Y02B 70/1491
USPC .................. 323/282–285; 363/21.12–21.13, 363/21.17–21.18, 78
See application file for complete search history.

(56) References Cited

U.S. PATENT DOCUMENTS

| | | | |
|---|---|---|---|
| 6,215,288 B1* | 4/2001 | Ramsey et al. | 323/224 |
| 6,969,981 B1* | 11/2005 | Fairbanks | H02J 7/022 323/274 |
| 7,394,669 B2* | 7/2008 | Fahlenkamp et al. | 363/21.15 |
| 7,788,977 B2 | 9/2010 | Nagata | |
| 8,519,688 B2* | 8/2013 | Halberstadt | 323/282 |
| 2008/0084723 A1 | 4/2008 | Balakrishnan et al. | |
| 2008/0130324 A1* | 6/2008 | Choi | H02M 3/33507 363/21.03 |
| 2008/0310194 A1* | 12/2008 | Huang | H02M 3/33507 363/21.18 |
| 2009/0316441 A1* | 12/2009 | Hu | 363/21.06 |
| 2010/0321963 A1 | 12/2010 | Yamashita | |
| 2011/0051470 A1 | 3/2011 | Li et al. | |
| 2011/0175584 A1* | 7/2011 | Huber et al. | 323/282 |
| 2012/0127761 A1* | 5/2012 | Halberstadt | H02M 3/337 363/21.02 |

FOREIGN PATENT DOCUMENTS

| | | | |
|---|---|---|---|
| CN | 101184973 A | 5/2008 | |
| EP | 10161366 | * 4/2010 | ............. H02M 3/00 |
| EP | 10251997 | * 11/2010 | ............. H02M 3/00 |

\* cited by examiner

*Primary Examiner* — Adolf Berhane
*Assistant Examiner* — Henry Lee, III
(74) *Attorney, Agent, or Firm* — Slater Matsil, LLP (57) ABSTRACT

In accordance with an embodiment, a method of driving a switching element in a switching converter includes generating a feedback signal that is dependent on the output voltage, driving the switching element in a plurality of subsequent burst cycles, determining a burst frequency, and adjusting an effective switching frequency in at least one burst cycle dependent on the determined burst frequency. Each burst cycle includes a burst-on period and a subsequent burst-off period, and determining the burst frequency includes evaluating a duration of at least one burst cycle.

8 Claims, 10 Drawing Sheets

| fb$_{out}$ | fb (kHz) with skipping witching pulse per 7 pulses | | | | | |
|---|---|---|---|---|---|---|
| | x=1 | x=2 | x=3 | x=4 | x=5 | x=6 |
| 4.00 | 3.83 | 3.60 | 3.25 | 2.66 | 1.50 | -2.04 |
| 3.90 | 3.72 | 3.46 | 3.07 | 2.43 | 1.15 | -2.75 |
| 3.80 | 3.60 | 3.32 | 2.90 | 2.20 | 0.80 | -3.45 |
| 3.70 | 3.48 | 3.18 | 2.72 | 1.96 | 0.43 | -4.15 |
| 3.60 | 3.37 | 3.04 | 2.55 | 1.73 | 0.10 | -4.86 |
| 3.50 | 3.25 | 2.90 | 2.37 | 1.50 | -0.24 | -5.56 |
| 3.40 | 3.13 | 2.76 | 2.20 | 1.26 | -0.59 | -6.27 |
| 3.30 | 3.02 | 2.62 | 2.02 | 1.03 | -0.94 | -6.97 |
| 3.20 | 2.90 | 2.48 | 1.85 | 0.79 | -1.29 | -7.68 |
| 3.10 | 2.78 | 2.34 | 1.67 | 0.56 | -1.64 | -8.38 |
| 3.00 | 2.67 | 2.20 | 1.50 | 0.33 | -1.99 | -9.08 |
| 2.90 | 2.55 | 2.06 | 1.32 | 0.09 | -2.34 | -9.79 |
| 2.80 | 2.43 | 1.92 | 1.15 | -0.14 | -2.69 | -10.49 |
| 2.70 | 2.32 | 1.78 | 0.97 | -0.37 | -3.04 | -11.20 |
| 2.60 | 2.20 | 1.64 | 0.80 | -0.61 | -3.39 | -11.90 |
| 2.50 | 2.08 | 1.50 | 0.62 | -0.84 | -3.74 | -12.61 |
| 2.40 | 1.97 | 1.36 | 0.45 | -1.07 | -4.09 | -13.31 |
| 2.30 | 1.85 | 1.22 | 0.27 | -1.31 | -4.44 | -14.01 |
| 2.20 | 1.73 | 1.08 | 0.10 | -1.54 | -4.79 | -14.72 |
| 2.10 | 1.62 | 0.94 | -0.08 | -1.78 | -5.14 | -15.42 |
| 2.00 | 1.50 | 0.80 | -0.25 | -2.01 | -5.49 | -16.13 |
| 1.90 | 1.38 | 0.66 | -0.43 | -2.24 | -5.84 | -16.83 |
| 1.80 | 1.27 | 0.52 | -0.60 | -2.48 | -6.19 | -17.54 |
| 1.70 | 1.15 | 0.38 | -0.78 | -2.71 | -6.54 | -18.24 |
| 1.60 | 1.03 | 0.24 | -0.95 | -2.94 | -6.89 | -18.94 |
| 1.50 | 0.92 | 0.10 | -1.13 | -3.18 | -7.24 | -19.65 |
| 1.40 | 0.80 | -0.04 | -1.30 | -3.41 | -7.59 | -20.35 |
| 1.30 | 0.68 | -0.18 | -1.48 | -3.64 | -7.94 | -21.06 |
| 1.20 | 0.57 | -0.32 | -1.65 | -3.88 | -8.29 | -21.76 |
| 1.10 | 0.45 | -0.46 | -1.83 | -4.11 | -8.64 | -22.46 |
| 1.00 | 0.33 | -0.60 | -2.01 | -4.35 | -8.99 | -23.17 |

| $R_{FB}$ range | $R_{FB0}$ | $R_{FB1}$ | $R_{FB2}$ | $R_{FB3}$ |
|---|---|---|---|---|
| $R_{FB}$ (kΩ) | 15.4 | 11.3 | 7.9 | 4.2 |
| Normalized fb | 1 | 0.8 | 0.63 | 0.45 |

BURST-MODE OPERATION OF A SWITCHING CONVERTER

TECHNICAL FIELD

Embodiments of the present invention relate to a switching converter. The invention, in particular, relates to a method for operating a switching converter in a burst mode and to a switching converter configured to be operated in a burst mode.

BACKGROUND

Switching converters are widely used in the field of power conversion. A switching converter includes at least one switch that is configured to generate a pulse-width modulated (PWM) voltage from an input voltage, and a rectifier arrangement that receives the PWM voltage and generates an output voltage to be supplied to a load. Usually the rectifier arrangement includes at least one inductive storage element, such as a choke, and at least one capacitive storage element, such as a capacitor. The PWM voltage is generated by switching the switching element on and off in accordance with a PWM drive signal. The drive signal is provided by a controller dependent on the output voltage. The controller is configured to vary the duty cycle of the drive signal in order to control the output voltage such that it assumes a given set-voltage.

The duty cycle of the drive signal is dependent on a power consumption of the load, whereas the duty cycle increases when the power consumption increases, and the duty cycle decreases when the power consumption decreases. Under low-load conditions, which is when a power consumption of the load is very low, modern controllers enter a burst mode. In the burst mode the switching element is cyclically switched on and off during a burst-on period, and the switching element is permanently in an off-state during a burst-off period subsequent to the burst-on period. The burst-on period and the burst-off period define a burst period $T_{BP}$ and a burst frequency $f_{BP}$, where $f_{BP}=1/T_{BP}$. The burst frequency is dependent on several parameters, such as the input voltage, and the power consumption of the load.

Problems may occur when the burst frequency is in a frequency range of between 1 kHz and 4 kHz. A burst frequency in this range may cause an annoying audible noise. There is, therefore, a need to prevent the generation of an audible noise when a switching converter is operated in its burst mode.

SUMMARY OF THE INVENTION

A first aspect relates to a method for driving a switching element in a switching converter that provides an output voltage. The method includes generating a feedback signal that is dependent on the output voltage, and driving the switching element in a plurality of subsequent burst cycles, each burst cycle comprising a burst-on period and a subsequent burst-off period, wherein the switching element is switched on and off at a switching frequency in the burst-on period and is switched off in the burst-off period. The method further includes determining a burst frequency, wherein determining the burst frequency comprises evaluating the duration of at least one burst cycle, and adjusting the switching frequency in at least one burst cycle dependent on the determined burst frequency.

A second aspect relates to a method for driving a switching element in a switching converter that provides an output voltage. The method includes generating a feedback signal that is dependent on the output voltage using a variable resistor, and driving the switching element in a plurality of subsequent burst cycles, each burst cycle comprising a burst-on period and a subsequent burst-off period, wherein the switching element is switched on and off at a switching frequency in the burst-on period and is switched off in the burst-off period. The method further includes determining a burst frequency, wherein determining the burst frequency comprises evaluating the duration of at least one burst cycle, and varying a resistance value of the resistor dependent on the determined switching frequency.

BRIEF DESCRIPTION OF THE DRAWINGS

Embodiments of the present invention will now be explained with reference to the drawings. It should be noted that these embodiments serve to illustrate the basic principles, so that only those features necessary for understanding the basic principles are illustrated. The drawings are not to scale. Further, like reference characters denote like features throughout the drawings.

DETAILED DESCRIPTION OF ILLUSTRATIVE EMBODIMENTS

Figure 1:
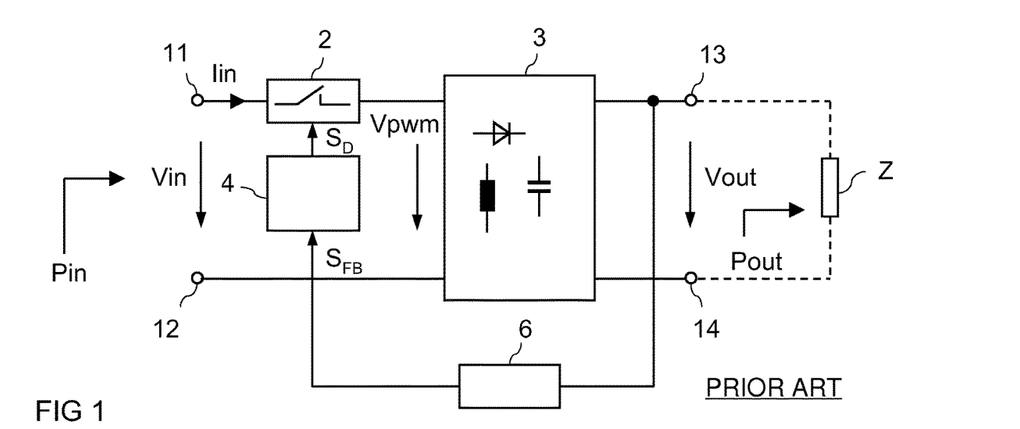
FIG. 1 shows a block diagram illustrating a switching converter.

FIG. 1 illustrates a basic block diagram of a switching converter. The switching converter includes input terminals 11, 12 for applying an input voltage Vin, and output terminals 13, 14 for providing an output voltage Vout. The output voltage Vout can be supplied to a load Z (illustrated in dashed lines). The switching converter includes at least one switching element 2 that is connected between one of the input terminals 11, 12 and a rectifier arrangement 3. In the embodiment illustrated in FIG. 1, the switching element 2 is connected between a first input terminal 11 and the rectifier arrangement. However, this is only an example. The switching element 2 could also be connected between a second input terminal 12 and the rectifier arrangement 3. The input voltage Vin can be a DC voltage or an AC voltage.

The switching element 2 is switched on and off in accordance with a drive signal $S_D$ provided by a controller 4. By virtue of being switched on and off the switching element 2 generates a pulse-width modulated voltage Vpwm from the input voltage Vin. The pulse-width modulated voltage Vpwm is supplied to the rectifier arrangement 3 that generates the output voltage Vout from the pulse-width modulated voltage Vpwm. The pulse-width modulated voltage Vpwm has a duty cycle which corresponds to a duty cycle of the drive signal $S_D$ generated by controller 4.

The input power Pin of the switching converter and, therefore, the output voltage Vout can be adjusted by varying the duty cycle of the drive signal $S_D$. In a normal operation mode of the switching converter the controller 4 is configured to adjust the duty cycle of the drive signal $S_D$ such that the output voltage Vout assumes the value of a set-voltage. For this, the controller 4 receives a feedback signal $S_{FB}$ that is dependent on the output voltage Vout. The feedback signal $S_{FB}$ is provided by a feedback circuit 6 connected between one of the output terminals and the controller 4. The feedback signal $S_{FB}$ is dependent on a difference between the output voltage Vout and the set-voltage. The feedback signal $S_{FB}$ can be generated from this difference using a filter having a proportional (P) characteristic, an integral (I) characteristic, or a proportional-integral-characteristic (PI). Feedback circuits, such as feedback circuits 6 in FIG. 1, that generate a feedback signal $S_{FB}$ that is dependent on a difference between an output voltage Vout and a set-voltage or reference voltage in a switching converter, are commonly known, so that no further explanations are required in this regard.

According to one embodiment, the feedback signal $S_{FB}$ increases when the output voltage Vout is currently too low, and the duty cycle increases with increasing feedback signal. In this case, an increasing feedback signal $S_{FB}$ helps to increase the input power Pin of the switching converter and, therefore, helps to increase the output power provided to the load Z.

Figure 2:
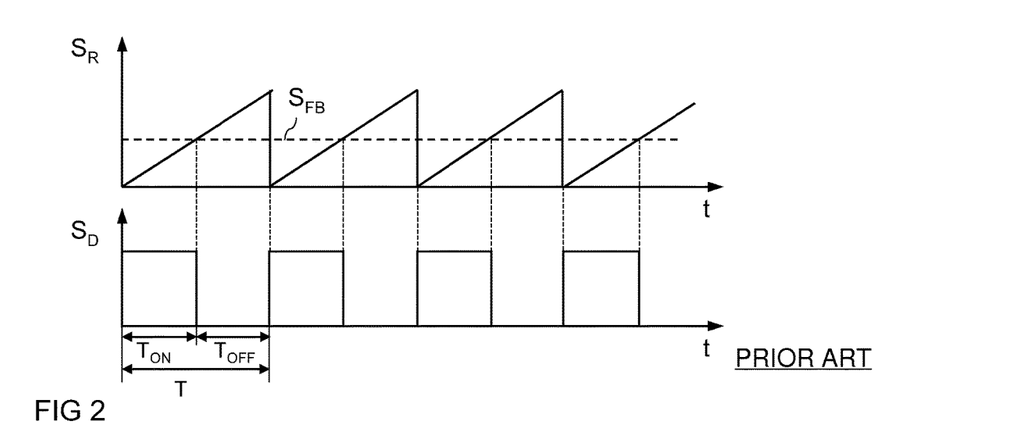
FIG. 2 illustrates the operating principle of a switching converter in a normal operation mode.

The basic operating principle of the controller 4 in the normal operation mode of the switching converter will now briefly be explained with reference to FIG. 2. FIG. 2 schematically illustrates timing diagrams of the drive signal $S_D$, the feedback signal $S_{FB}$ and a ramp signal $S_R$. The ramp signal $S_R$ is used together with the feedback signal $S_{FB}$ to generate the drive signal $S_D$. The ramp signal $S_R$ is a periodic signal with a frequency f=1/T. The drive signal $S_D$ is generated dependent on the ramp signal $S_R$ and the feedback signal $S_{FB}$ such that a signal pulse or drive pulse of the drive signal $S_D$ starts each time a ramp of the ramp signal $S_R$ starts, and the drive pulse ends each time the ramp signal $S_R$ reaches the feedback signal $S_{FB}$. In FIG. 2, $T_{ON}$ denotes the duration of an on-period of the drive pulse $S_D$, which is the period when the drive pulse switches the switching element 2 on, and $T_{OFF}$ denotes the duration of an off-period, which is the period when the switching element 2 is switched off. A time period that includes the on-period $T_{ON}$ and the off-period $T_{OFF}$ will be referred to as a switching period in the following. A duration of the switching period is T, where $T=T_{ON}+T_{OFF}$. T defines the switching frequency f, where f=1/T. According to one embodiment, T constant.

In the normal operation mode of the switching converter, a duty cycle D of the switching operation is defined as $D=T_{ON}/T$. The duty cycle D defines the input power of the switching converter, where the input power increases when the duty cycle D increases. It can be seen from FIG. 2 that the on-period $T_{ON}$ and, therefore, the duty cycle D increases when the signal level of feedback signal $S_{FB}$ increases.

The ramp signal $S_R$ can be generated by a ramp signal generator (not shown) which generates a ramp signal with a plurality of timely subsequent ramps, each having a rising edge with a fixedly defined slope. According to another embodiment, the ramp signal $S_R$ corresponds to or can be generated from the input current Iin of the switching converter. This input current Iin, due to an inductive characteristic of the rectifier arrangement 3, starts to increase each time the switching element 2 is switched on. Dependent on the specific characteristic of the rectifier arrangement 3, the input current Iin immediately drops to zero when the switching element 2 is switched off. This results in a timing diagram as illustrated in FIG. 2. According to a further embodiment, the input current Iin linearly decreases when the switching element 2 is switched off. This results in a triangular waveform of the ramp signal $S_R$ (not shown). The basic operating principle of a switching converter in a normal operation mode is commonly known, so that no further explanations are required in this regard.

The switching element 2 can be implemented as a conventional electronic switch, such as a MOSFET or an IGBT. In a switching element that is implemented as a MOSFET or an IGBT two different kinds of losses may occur. These losses include capacitive losses and ohmic losses. The ohmic losses result from an on-resistance of the switching element 2 and occur when the switching element 2 is switched on. The on-resistance of the switching element 2 is its ohmic resistance in its switched-on state (on-state). Capacitive losses occur each time when the switching element is switched on and is switched off. These capacitive losses result from parasitic capacitances (not shown) that are inevitably present in a MOSFET or an IGBT, and that are charged and discharged when the device is switched on and off.

Under low-load conditions, which is when a power consumption of the load Z is very low, the duration $T_{ON}$ of the on-period and, therefore, the duty cycle D decreases. With decreasing duty cycle D the capacitive losses may prevail the overall losses occurring in the switching element 2. There is, therefore, an operation point (defined by the power consumption of the load) of the switching converter at which it would be inefficient to further decrease the duty cycle D.

When such low-load conditions occur, the controller 4 is configured to enter a burst mode. In the burst mode there is a fixed duty cycle of the switching operations of the switching element 2, and there are alternatingly burst-on periods in which the switching element 2 is cyclically switched on and off and burst-off periods in which the switching element 2 is permanently switched off. The operating principle of the switching converter in the burst mode will now briefly be explained with reference to FIG. 3, in which timing diagrams of the feedback signal $S_{FB}$ and the drive signal $S_D$ are illustrated. It should be noted that the timing diagrams in FIGS. 2 and 3 have different scales.

The feedback signal $S_{FB}$ is representative of the power consumption of the load Z. According to one embodiment, the switching converter enters the burst mode when the feedback signal $S_{FB}$ drops to a threshold, which will be referred to as burst-mode-on threshold in the following. When the switching converter enters the burst mode the switching element 2 is at first switched off. This causes the output voltage Vout to decrease and, therefore, causes the feedback signal $S_{FB}$ to increase until the feedback signal $S_{FB}$ reaches an upper threshold TH4, which will be referred to as burst-on threshold in the following.

In conventional switching converters a sequence of drive cycles with each drive cycle having a fixed on-period and a fixed off-period are generated after the feedback signal $S_{FB}$ has reached the burst-on threshold TH4, wherein the switching element is switched on during the on-period and is switched off during the off-period. This causes the output voltage Vout to increase (as long as the load Z is in its low power consumption mode, such as a standby mode) and the feedback signal $S_{FB}$ to decrease. When the feedback signal $S_{FB}$ has decreased to a burst-off threshold TH3 that is below the burst-on threshold TH4 the switching element 2 is switched off and is kept in its off-state until the feedback signal $S_{FB}$ has again increased to the burst-on threshold TH4. The oscillating characteristic of the feedback signal $S_{FB}$ in the burst mode results from the fact that the power provided to load Z during the burst-on periods is higher than the power required by the load Z, and during the burst-off periods is lower than the power consumption of the load Z. The switching converter leaves the burst mode when the feedback signal $S_{FB}$ increases to a burst-mode-off threshold that is above the burst-on threshold TH4. The feedback signal $S_{FB}$ increases to this burst-mode-off threshold when the power consumption of the load Z increases so that not enough power can be provided during the burst-on periods anymore.

Figure 3:
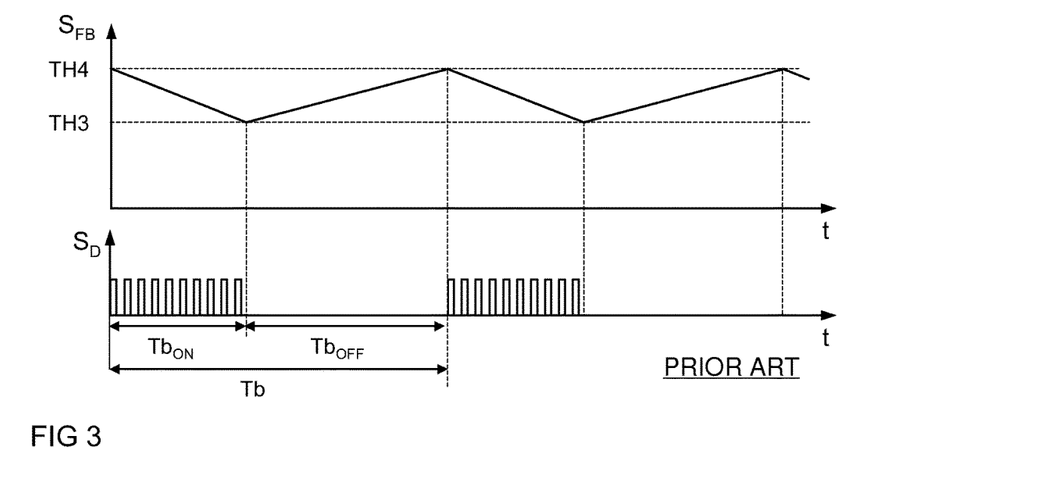
FIG. 3 illustrates the operating principle of a switching converter in a burst mode.

FIG. 3 schematically illustrates timing diagrams of the feedback signal $S_{FB}$ and of the drive signal $S_D$ in the burst mode of a conventional switching converter. In FIG. 3, TH3 denotes the burst-off threshold and TH4 denotes the burst-on threshold. The burst-mode-on threshold and the burst-mode-off threshold that govern entering and leaving the burst mode are not illustrated in FIG. 3.

In FIG. 3, $Tb_{ON}$ denotes the duration of a burst-on period, and $Tb_{OFF}$ denotes the duration of a burst-off period. These durations are dependent on different parameters, such as the power consumption of the load Z or the input voltage Vin. Referring to FIG. 3, a burst-on period $Tb_{ON}$ and a subsequent burst-off period $Tb_{OFF}$ define a burst period Tb, where a burst frequency fb is defined as: fb=1/Tb. The burst frequency fb is the frequency at which burst-on periods or burst-off periods occur.

Problems may occur when this burst frequency fb is in an audible frequency range, such as in a frequency range between 1 kHz and 4 kHz. A burst frequency fb in the audible frequency range may result in annoying noise generated by the switching converter. It is, therefore, desired to keep the burst frequency fb below a given frequency threshold, such as below 1.2 kHz, below 1 kHz, of even below 0.9 kHz.

One embodiment of a method for driving a switching element, such as switching element 2 of FIG. 1, in a switching converter in the burst mode includes determining the burst frequency fb by evaluating the duration of at least one burst period. The method further includes to reduce the average switching frequency in at least one burst-on period that follows the burst-on period(s) used for evaluation purposes, when the burst frequency fb is above the given threshold, such as 1.2 kHz, 1 kHz or 0.9 kHz. "To reduce this switching frequency" means that the switching frequency during at least one burst-on period is reduced as compared to the switching frequency in the at least one burst period that has been evaluated in order to determine the burst frequency fb.

Figure 4:
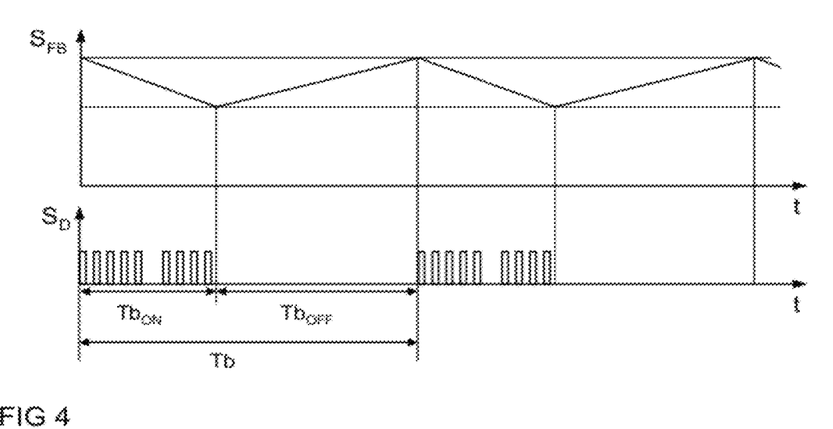
FIG. 4 schematically illustrates the operating principle of a switching converter operated in a burst mode, wherein a switching frequency during burst-on periods is adjustable.

A first embodiment of a method for reducing the switching frequency will be explained with reference to FIG. 4. In FIG. 4 timing diagrams of the feedback signal $S_{FB}$ and the drive signal $S_D$ in the burst mode are illustrated. In this method, drive pulses at a fixed frequency and with a fixed-on period are generated during the burst-on periods. However, in order to reduce the average or effective switching frequency during the burst-on period $Tb_{ON}$ some on-pulses during the burst-on period are skipped or not generated. This is schematically illustrated in FIG. 4. Skipping some of the on-pulses during one burst-on period $Tb_{ON}$ results in an average (effective) switching frequency during the burst-on period that is lower than the switching frequency at which the on-pulses are generated. Different skipping schemes can be applied when generating the drive signal $S_D$ during the burst-on periods in the burst mode. Some of these skipping schemes will be explained herein further below.

Figure 5:
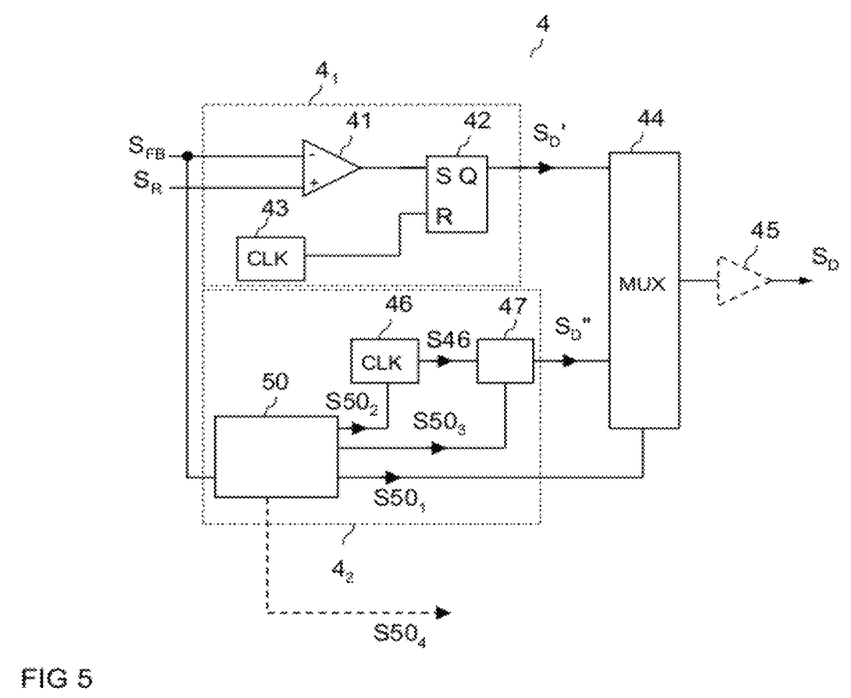
FIG. 5 schematically illustrates an embodiment of a switch controller of a switching converter.

FIG. 5 schematically illustrates an embodiment of a control circuit 4 which is configured to generate a drive signal $S_D$, and which is specifically configured to reduce the switching frequency by skipping individual drive pulses during burst-on periods when a burst frequency fb is higher than a given threshold value. It should be noted that FIG. 5 is a block diagram that only schematically shows relevant functional blocks of the control circuit 4. It should be noted that these functional blocks can be implemented in many different ways.

Referring to FIG. 5, the control circuit 4 includes two signal generation units: a first signal generation unit $4_1$ that generates the drive signal $S_D$ in the normal operation mode of the control circuit 4; and a second signal generation unit $4_2$ that generates the drive signal $S_D$ in the burst mode. In the present embodiment, the first signal generation unit $4_1$ includes a comparator 41 that receives the feedback signal $S_{FB}$ and the ramp signal $S_R$, a first clock generator 43 that generates a first clock signal, and a flip-flop 42 that receives an output signal of the first clock generator 43 at a set input S and an output signal of the comparator 41 at a reset input R. A first drive signal $S_D'$ is available at an output Q of the flip flop 42. In the normal operation mode, flip-flop 42 is set at the beginning of each clock cycle of the first clock generator 43, so that a drive pulse of the first drive signal $S_D'$ starts at the beginning of each clock cycle of the clock generator 43. At this time, ramp signal $S_R$ starts to increase. The flip-flop 42 is reset, so that the drive pulse of the first drive signal $S_D'$ ends, when the ramp signal $S_R$ reaches the feedback signal $S_{FB}$. This basic functionality of the control circuit 4 in a normal operation mode corresponds to the functionality that is illustrated in FIG. 1. According to one embodiment, the ramp signal $S_R$ is proportional to the input current Iin of the switching converter (see FIG. 1).

The first drive signal $S_D'$ is received at a first input of a multiplexer 44 that is controlled by a burst-mode control circuit 50. Burst-mode control circuit 50 receives the feedback signal $S_{FB}$ and generates a first output signal $S50_1$ which will be referred to as burst-mode control signal in the following. The multiplexer 44 receives the burst-mode control signal $S50_1$ at a control input and is configured to pass the drive signal $S_D'$ through to its output when the burst-mode control signal $S50_1$ indicates that the control circuit 4 is in the normal operation mode. The drive signal $S_D$ is available at the output of the multiplexer 44. Optionally, an amplifier 45 amplifies the output signal of the multiplexer 44 in order to generate the drive signal $S_D$. The drive signal $S_D$ is a pulse-width modulated signal that is configured to drive the switching element 2 (see FIG. 1) on and off.

The second drive signal generation unit $4_2$ generates a second drive signal $S_D''$ that is received at a second input of the multiplexer 44. The multiplexer 44 passes this second drive signal $S_D''$ through to its output in order to form the drive signal $S_D$ when the burst-mode control signal $S50_1$ indicates that the control circuit 4 is in the burst mode. The second drive signal generation unit includes a second clock generator 46 that is activated and deactivated by a second output signal $S50_2$ of the burst-mode control circuit 50. This second output signal $S50_2$ will be referred to as burst control signal in the following. The burst-mode control circuit 50 is configured to activate the second clock generator 46 during burst-on periods (see $Tb_{ON}$ in FIG. 3), and to deactivate the second clock generator 46 during the burst-off periods (see $Tb_{OFF}$ in FIG. 3). When the second clock generator 46 is activated, it generates an output signal S46 that includes a sequence of drive pulses at a given switching frequency. These drive pulses have a fixed duration.

The second drive signal generation circuit further includes a blanking circuit 47 which is configured to blank out or to skip individual drive pulses in the sequence of drive pulses provided by the second clock generator 46. The blanking circuit 47 is controlled by a third output signal $S50_3$ of the burst-mode control circuit 50. This third output signal $S50_3$ will be referred to as blanking signal in the following.

The blanking signal $S50_3$ includes information on the frequency at which drive pulses are to be blanked out. According to one embodiment that will be explained in detail herein further below, the clock signal S46 is subdivided into groups with n subsequent clock pulses, wherein the skipping circuit 47 is configured to skip or blank-out x clock pulses in each of these sequences, where x is between 0 and n−1. In this embodiment, the blanking signal $S50_3$ defines x, which means that the blanking signal defines how many clock pulses are skipped in each sequence of n clock pulses.

It should be noted that FIG. 5 only schematically illustrates the operating principle of the control circuit 4. The two signal generation units $4_1$, $4_2$ can be implemented in many different ways.

Figure 6:
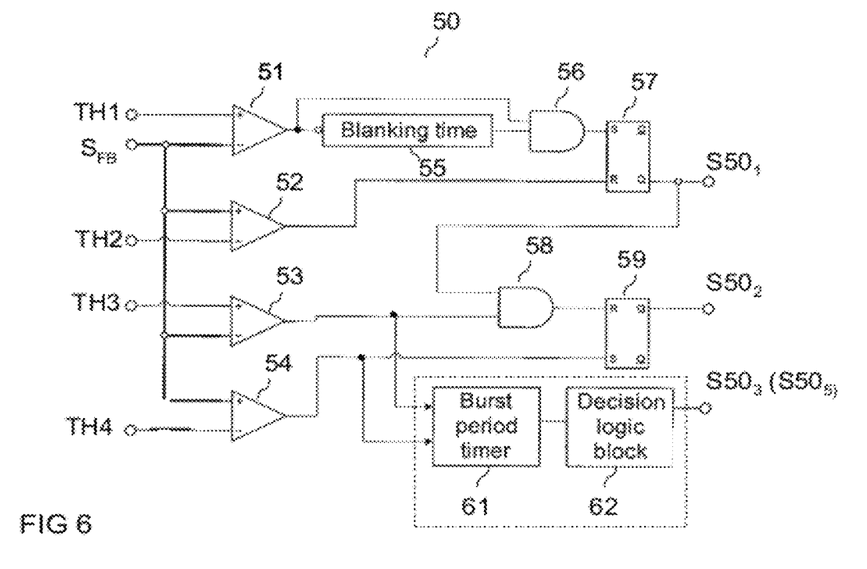
FIG. 6 schematically illustrates an embodiment of a burst control circuit that can be implemented in a controller of a switching converter.

FIG. 6 schematically illustrates an embodiment of the burst-mode control circuit 50. The burst-mode control circuit 50 according to this embodiment includes three units: a first unit that generates the burst-mode control signal $S50_1$, a second unit that generates the burst control signal $S50_2$, and a third unit that generates the blanking signal $S50_3$. The first unit receives the feedback signal $S_{FB}$, the burst-mode-on threshold TH1 and the burst-mode-off threshold TH2. The burst-mode control signal $S50_1$ is available at a (non-inverting) output Q of a first flip flop 57. This flip flop 57 is set each time the feedback signal $S_{FB}$ falls below the burst-mode-on threshold TH1. The first flip flop 57 is reset each time the feedback signal $S_{FB}$ rises to above the burst-mode-off threshold TH2. The first unit includes a first comparator 51 that compares the feedback signal $S_{FB}$ with the burst-mode-on threshold TH1 and a second comparator 52 that compares the feedback signal $S_{FB}$ with the burst-mode-off threshold TH2. At the output of the first comparator 51 a set signal for the first flip flop 57 is available, and at the output of the second comparator 52 a reset signal for the first flip flop 57 is available. In the embodiment illustrated in FIG. 6, the first flip flop 57 indicates that the control circuit is in the burst mode whenever the first flip flop 57 is set, and indicates that the first flip flop 57 is in a normal operation mode whenever the first flip flop 57 is reset. In this embodiment, a high signal level (a logic "1") of the burst-mode control signal $S50_1$ indicates that the control signal is in its burst mode, while a low signal level (a logic "0") of the burst-mode control signal $S50_1$ indicates that the control circuit 4 is in the normal operation mode. However, this is only an example, for indicating the burst mode and the normal operation mode other signal levels may be used as well.

Optionally, the set signal of the first flip flop 57 is not only the output signal of the first comparator 51, but is obtained by AND-connecting the output signal of the first comparator 51 with a delayed version of this output signal, wherein the delayed version of the comparator output signal is available at the output of a delay element 55. In this embodiment, the burst mode is not entered before the feedback signal $S_{FB}$ remains below the burst-mode-on threshold TH1 for a given time period defined by the delay element 55.

The burst control signal $S50_2$ is available at the output of a second flip flop 59. This flip flop 59 receives the output signal of a third comparator 53 as a reset signal and the output signal of a fourth comparator 54 as a set signal. Optionally, the output signal of the third comparator 53 is AND-connected with the burst-mode control signal $S50_1$. In the embodiment illustrated in FIG. 6, the burst control signal $S50_2$ has a high signal level (a logic "1") when the second flip flop 59 is set, and has a low signal level (representing a logic "0") when the second flip flop 59 is reset. The second flip flop 59 is set each time the feedback signal $S_{FB}$ rises to or rises above the burst-on threshold TH4 (see also FIGS. 3 and 4), so as to start a burst-on period. The burst-on threshold TH4 and the feedback signal $S_{FB}$ are received at input signals of the fourth comparator 54. The second flip flop 59 is reset, so as to end a burst-on period and to begin a burst-off period, each time the feedback signal $S_{FB}$ decreases to or falls below the burst-off threshold TH3 (see also FIGS. 3 and 4). Referring to what has been explained herein before, the burst-on threshold TH4 is higher than the burst-off threshold TH3. Further, the burst-mode-on threshold TH1 is lower than the burst-off threshold TH3, and the burst-mode-off threshold TH2 is above the burst-on threshold TH4. According to one embodiment, the burst-mode-on threshold TH1 is about 1.2V, the burst-mode-off threshold TH2 is about 4.5V, the burst-on threshold TH4 is about 4.0V, and the burst-off threshold TH3 is about 3.5V.

The third unit that generates the blanking signal $S50_3$ is configured to determine the burst frequency fb based on the duration of at least one burst period, which includes a burst-on period ($Tb_{ON}$ in FIGS. 3 and 4) and a burst-off period ($Tb_{OFF}$ in FIGS. 3 and 4). Referring to what has been explained herein before the burst frequency fb is the reciprocal of the burst period Tb. The third unit includes a burst period timer 61 that receives at least one of the output signals of the third and fourth comparators 53, 54. In the embodiment in FIG. 6, the burst period timer 61 receives both of these comparator signals. These comparator signals include an information on when burst-on periods and burst-off periods start. The time period between two subsequent starts of burst-on periods or between two subsequent starts of burst-off periods corresponds to the burst period Tb. The burst period timer 61 is configured to calculate the burst period Tb of at least one burst. According to another embodiment, the burst period timer determines the duration of exactly one burst. According to another embodiment, the burst period timer calculates the duration of a plurality of subsequent bursts, with each burst including a burst-on period and a subsequent burst-off period, and determines the mean value of the durations Tb of the individual bursts. The burst frequency can be calculated from the determined burst duration Tb.

Referring to FIG. 6, a decision logic 62 receives the information on the burst period duration Tb or the burst frequency fb and calculates the frequency at which drive signal pulses are to be skipped or blanked out. This information is included in the blanking signal $S50_3$.

Figure 7:
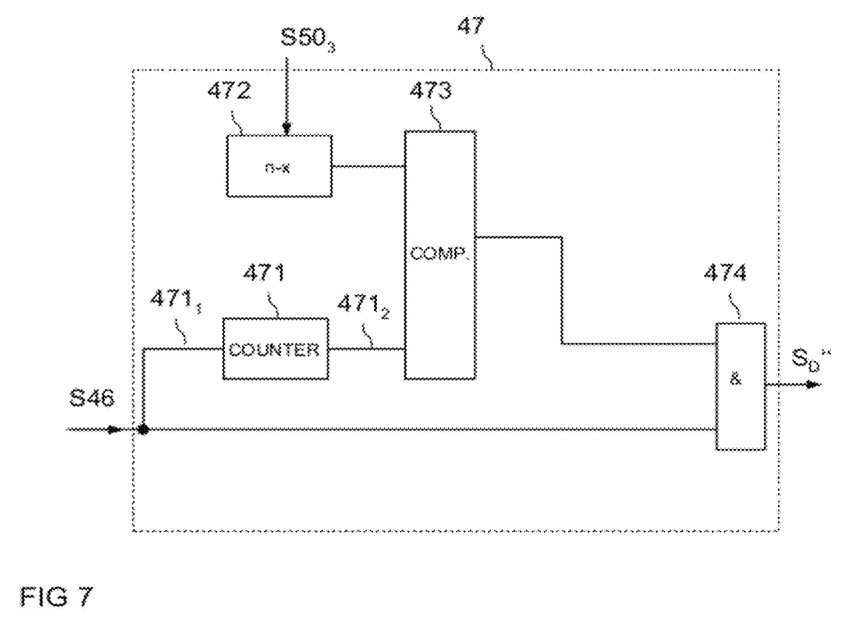
FIG. 7 illustrates an embodiment of a blanking circuit of the switch controller of FIG. 5.

FIG. 7 illustrates an embodiment of the skipping circuit 47 of FIG. 5. The skipping circuit 47 receives the blanking signal $S50_3$ that receives an information on the frequency at which clock pulses of the clock signal (see 46 in FIG. 5) are to be skipped or an information on how many clock pulses in each sequence with n clock pulses are to be skipped. The skipping circuit 47 of FIG. 7 is configured to receive a blanking signal $S50_3$ that defines or includes the number x of clock pulses that are to be skipped in each sequence of n subsequent clock pulses.

The skipping circuit of FIG. 7 includes a counter that receives the clock signal S46 at an input $471_1$ and that is configured to count clock pulses of the clock signal S46. A counter reading of the counter 471 is available at an output $471_2$ of the counter. The counter 471 is configured to cyclically count-up to a maximum value, where the maximum value corresponds to the number n of clock pulses in one sequence. According to one embodiment, the counter cyclically counts from 1 to n, where the counter reading changes with each clock pulse or clock cycle of the clock signal. In this case, the sequence of counter readings at the output $471_2$ of the counter is: 1, 2, . . . , n−1, n, 1, 2, . . . , n−1, n, 1, 2, . . . .

The skipping circuit further includes a storage unit 472 which receives the blanking signal $S50_3$ that represents x and that stores a value corresponding to n−x, where n−x is the number of clock pulses in each sequence of n clock pulses that are allowed to pass. A comparator 473 receives the counter reading of the counter 471 and n−x. An output of the comparator 473 controls a pass gate 474 receiving the clock signal S46 such that the pass gate 474 only allows clock pulses of the clock signal to pass when the counter reading is smaller than or equal to n−x. This is equivalent to the fact that in each sequence of n clock pulses x clock pulses are not allowed to pass. According to one embodiment, the pass gate 474 is implemented as an AND gate, and the counter generates a logic "0" at its output in order to "block" the gate whenever the counter reading is higher than n−x.

Figure 8:
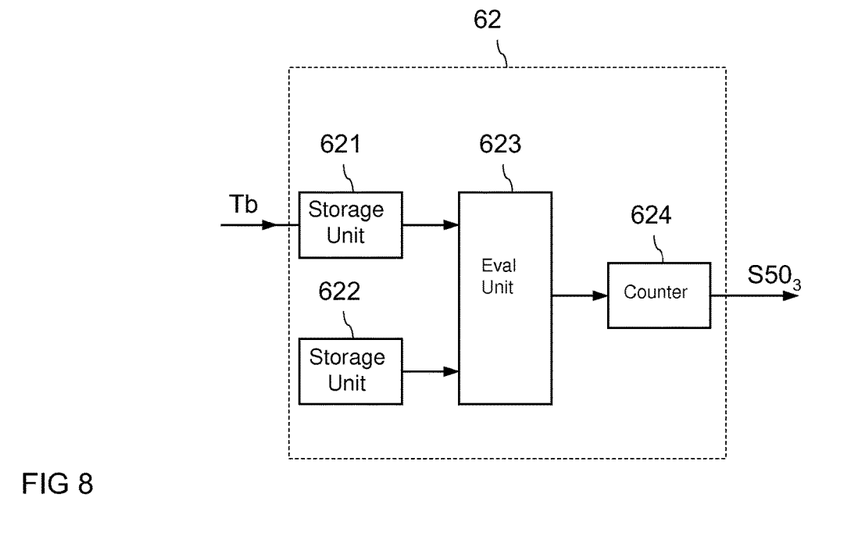
FIG. 8 illustrates an embodiment of a decision logic of FIG. 6.

FIG. 8 illustrates an embodiment of the decision logic 62. The decision logic receives an information on the duration Tb of one burst period or on the burst frequency fb, where fb=1/Tb, from the burst period timer. For explanation purposes it is assumed that the duration Tb of one burst period is provided to the decision logic. According to one embodiment, the burst period timer 61 provides a new burst period information every burst period, wherein the burst period information Tb can be generated by evaluating only one burst period or can be generated by evaluating a number of subsequent burst periods.

The decision logic 62 stores the burst period information Tb in a first storage unit 621 and compares the stored information with a reference value stored in a second storage unit 622. The reference value represents a duration of the burst period or a burst frequency at which the generation of audible noise is prevented, such as a burst frequency of 1 kHz or less. An evaluation unit 623 compares the current burst period information stored in the first storage unit 621 with the reference information stored in the second storage unit 622 and controls a counter 624 that generates an output signal which represents the number x of clock pulses to be skipped in a sequence of n clock pulses. According to one embodiment, the evaluation unit 623 is configured to increment the counter 624 each time a new burst period information Tb is stored that represents a burst frequency that is higher than a burst frequency represented by the reference information. A counter reading of the counter 624 represents the number x of clock pulses to be skipped in each pulse sequence with n clock pulses.

Figure 9:
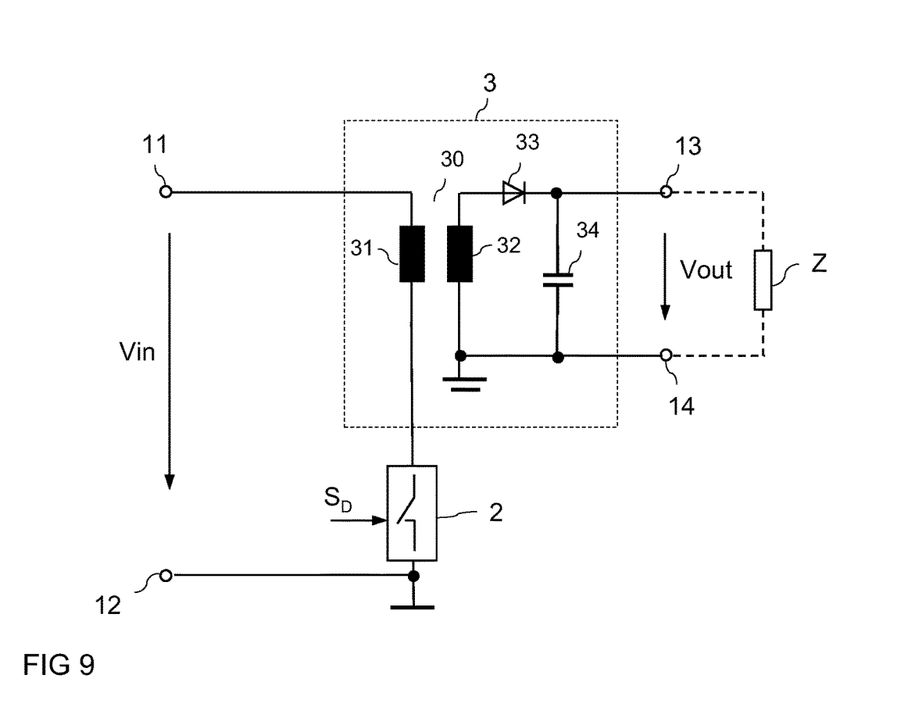
FIG. 9 schematically illustrates a block diagram of a switching converter implemented as a flyback converter.

The evaluation circuit 623 can also be configured to decrement the counter 624 in order to reduce the number x of clock cycles to be skipped. According to one embodiment, the evaluation unit 623 is configured to decrement the counter 624 each time a new burst period information is stored that represents a burst frequency below a threshold frequency. According to one embodiment, the threshold frequency is between 300 Hz and 500 Hz, such as 400 Hz, so that the counter 624 is decremented when the burst frequency is below this threshold. The effect of skipping or blanking out individual drive pulses will now be explained. For explanation purposes it is assumed that the switching converter is a flyback converter with a rectifier 3 topology as illustrated in FIG. 9. The flyback converter includes a transformer 30 with a primary winding 31 that is connected in series with the switching element 2, where the series circuit with the switching element 2 and the primary winding 31 is connected between the input terminals 11, 12. The transformer 30 further includes a secondary winding 32 that is inductively coupled with the primary winding 31. Further, a rectifier is connected in parallel with the secondary winding 32. The output voltage Vout is available at output terminals of the rectifier. The rectifier can be implemented like a conventional rectifier that is suitable to rectify a PWM voltage. In the embodiment illustrated in FIG. 7, the rectifier includes a series circuit with a diode 33 and a capacitive charge storage element, such as a capacitor 34. The output voltage Vout is available across the capacitor 34. It should be noted that any other rectifier suitable to be implemented in a flyback converter may be used as well.

In the flyback converter of FIG. 9, energy is stored in the primary winding 31 when the switching element 2 is switched on. When the switching element 2 is subsequently switched off, the energy stored in the primary winding 31 is transferred to the secondary winding 32 and the output terminals 13, 14 via the rectifier. Assume that $f_S$ is the switching frequency during the burst-on periods in the burst mode when there is no blanking or skipping of drive pulses. In this case, the average input power of the switching converter in one burst cycle is given as:

$$P_{in} = \frac{1}{2} \cdot L_P \cdot \left(\frac{Vin \cdot D}{fs \cdot L_p}\right)^2 \cdot fs \cdot \frac{Tb_{ON}}{Tb_{ON} + Tb_{OFF}} \qquad (1)$$

where Pin is the average input power, $L_P$ is the inductance of the primary winding 31, Vin is the input voltage, D is the duty cycle of the drive signal $S_D$, fs is the switching frequency during the burst-on periods, $Tb_{ON}$ is the duration of the burst-on period, and, $Tb_{OFF}$ is the duration of the burst-off period.

When the load Z is constant, the burst-off period $Tb_{OFF}$, which is the time when the switching element 2 is permanently switched off, so that the output voltage Vout decreases and feedback signal $S_{FB}$ increases, can be considered to be independent of the burst-on period. When drive pulses are blanked out or skipped during the burst-on period the overall duration $Tb_{ON}$ of the burst-on period increases. The input power Pin' of the switching converter in a scenario in which drive pulses during the burst-on period are blanked out can be expressed as follows:

$$P_{in} = \frac{1}{2} \cdot L_P \cdot \left(\frac{Vin \cdot D}{fs' \cdot L_p}\right)^2 \cdot fs' \cdot \frac{Tb_{ON'}}{Tb'_{ON} + Tb_{OFF}}, \quad (2)$$

where $Tb_{ON}'$ denotes the duration of the burst-on period, and fs' denotes the average or effective switching frequency during the burst-on period $Tb_{ON}'$. By virtue of skipping drive pulses, fs' is lower than the basic switching frequency fs.

If the power consumption of the load Z is constant, the input powers Pin, Pin' in the scenario in which no drive cycles are blanked out and in the scenario in which drive cycles are blanked out, respectively, are the same, so that Pin=Pin'. (3)

According to one embodiment, the drive signal $S_D$ during the burst-on period includes pulse sequences with a number of n subsequent drive pulses, wherein from each of these pulse sequences x drive cycles, with 1≤x<n, are blanked out or skipped. In this case x is dependent on the burst frequency fb that is to be adjusted. According to one embodiment, n=7. Let fs be the maximum switching frequency during the burst-on period. In this case, the average switching frequency fs' in the skipping mode can be expressed as:

$$fs' = fs \cdot \frac{n-x}{n}. \quad (4)$$

Reducing the switching frequency during the burst-on periods results in an increase of the duration of the burst-on periods, in an increase of the burst period, and in a decrease of the burst frequency.

Let $fb_{init}$ be the initial burst frequency when the controller enters the burst mode, and when no drive pulses are skipped. This initial burst frequency is dependent on several parameters, such as the input voltage Vin and the power consumption of the load. In this case, a burst frequency fb(n,x) that can be obtained by skipping x drive pulses from a sequence n drive pulses during the burst-on period can be expressed as follows:

$$fs(n, x) = \cfrac{1}{\cfrac{Tb_{OFF} \cdot fs}{\cfrac{n-x}{n} \cdot \cfrac{1}{\cfrac{1}{fb_{init}} - Tb_{OFF}} - 1} \cdot \cfrac{1}{fs} + Tb_{OFF}}. \quad (5)$$

Figure 10:
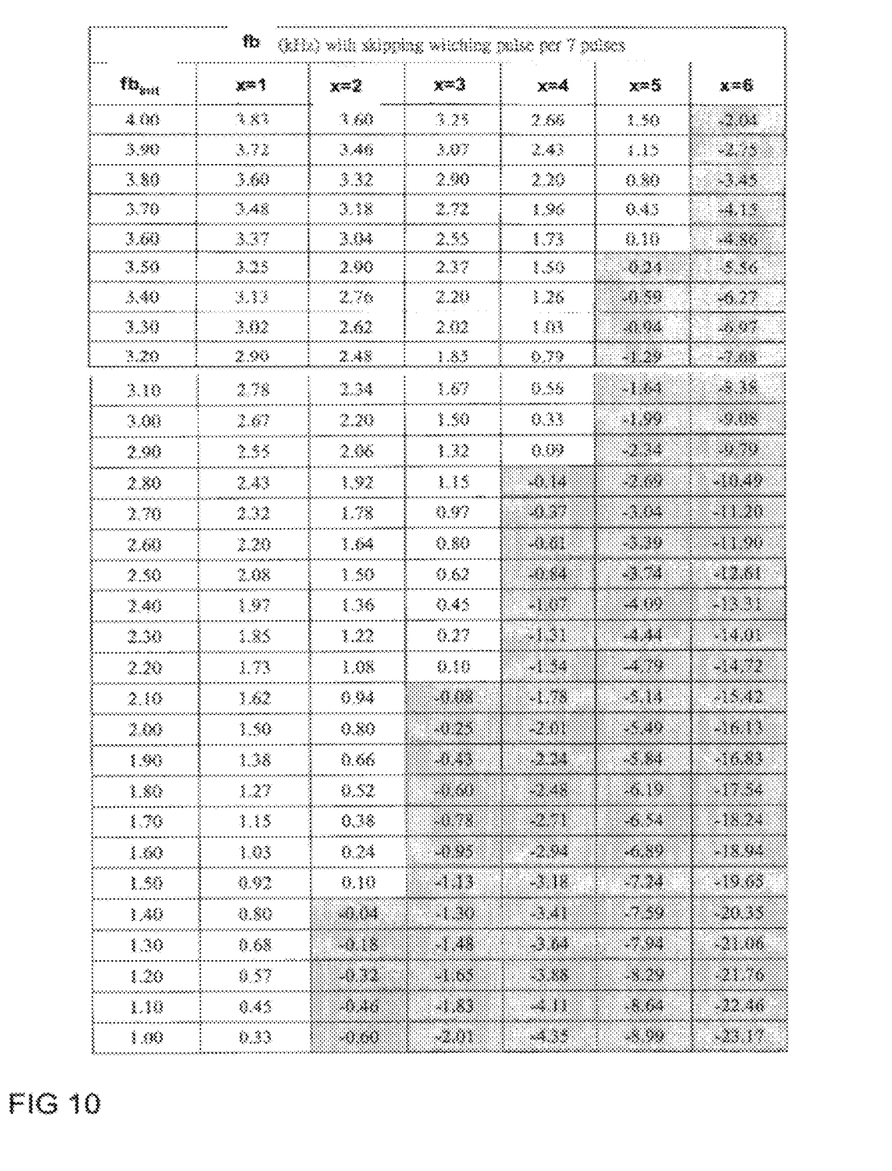
FIG. 10 shows a table illustrating the switching frequencies of a switching element in a switching converter that is operated in the burst mode at different parameters that influence the switching frequency.

According to one embodiment, n=7. A table in FIG. 10 illustrates the reduction of the burst frequency fb that can be obtained by varying x between 1 and 6. The first column in the table of FIG. 10 shows different initial burst frequencies $fb_{init}$. This initial burst frequency $fb_{init}$ is the burst frequency the switching converter assumes when it enters the burst mode. In the example illustrated in FIG. 10, the initial burst frequency ranges between 4 kHz and 1 kHz. In the example illustrated in FIG. 10 the maximum switching frequency $f_s$ is 100 kHz, and the duration $Tb_{OFF}$ of the burst-off periods is 0.2 ms. In the table of FIG. 10, columns 2 to 7 show the burst frequencies fb that can be obtained from the corresponding initial burst frequency $fb_{init}$ by skipping x=1, x=2, x=3, x=4, x=5 or x=6 drive pulses in each pulse sequence with n=7 pulses. In the table of FIG. 10, negative frequency values represent those cases in which the input power is lower than the power consumption of the load Z, so that the switching converter would have to leave the burst mode in order to sufficiently supply the load Z. Thus, dependent on the initial burst frequency the number x of skipped pulse drive pulses should not be so high that the power consumption of the load cannot be covered anymore (represented by negative burst frequencies in the table of FIG. 10). In the table of FIG. 10, the burst frequencies are given in kHz. It can be seen from this table that even at high initial burst frequencies, like burst frequencies in a range of between 3.60 kHz and 4.00 kHz the burst frequency can be significantly reduced to values between 0.10 kHz and 1.50 kHz by skipping a number (x=5 in the present case) of drive cycles during the burst-on period.

Reducing the effective switching frequency by skipping drive pulses during the burst-on period is only one of a plurality of different means to reduce the effective switching frequency during the burst on-period. According to another embodiment, the clock frequency of a clock generator that defines the frequency of the drive pulses during the burst on period is adjusted. An example of switch controller 4 having this functionality is illustrated in FIG. 11.

Figure 11:
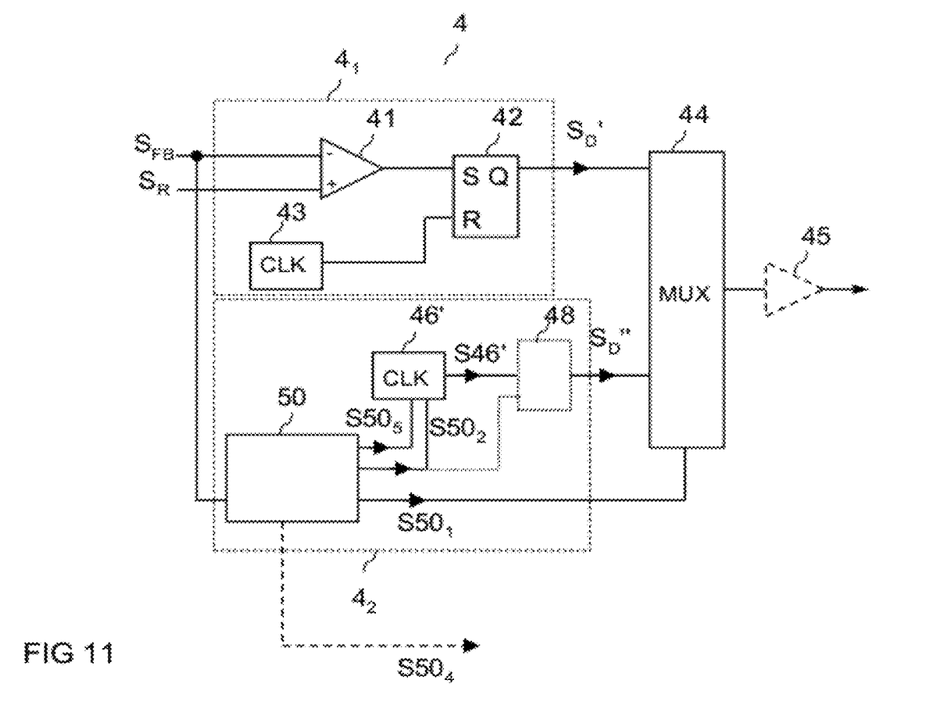
FIG. 11 illustrates a further embodiment of a switch controller of a switching converter.

The switch controller of FIG. 11 is based on the switch controller of FIG. 5. In the switch controller of FIG. 11, the second signal generation unit $4_2$ includes a clock generator 46' that is activated and deactivated by the second output signal $S50_2$ of the burst-mode control circuit 50, and that additionally includes a control input for adjusting a frequency of the clocked output signal S46' of the clock generator. In this embodiment, the burst-mode control circuit 50 generates a frequency adjustment signal $S50_5$ that is received at the control input of the clock generator 46' and that adjusts the frequency of the output signal S46'.

The clock generator 46' is configured such that the output signal S46' in the activated state includes a sequence of drive pulses at a frequency that is dependent on the frequency adjustment signal $S50_5$. The drive pulses have a fixed duration. According to one embodiment, the clock generator 46' includes a voltage controlled oscillator (VCO).

In the switch control circuit of FIG. 11, the burst mode control circuit 50 can be implemented as shown in FIG. 6, with the difference that the decision logic 62, which receives the information on the burst frequency fb or the burst duration Tb from the burst period timer 61, generates the frequency adjustment signal $S50_5$ (as indicated in brackets in FIG. 6) from this information. According to one embodiment, the decision logic is configured to reduce the frequency of the clock generator 46' as long as the burst frequency is above the burst frequency threshold, wherein the frequency may be reduced in discrete frequency steps. The burst frequency fb may be evaluated in the same way as explained in connection with the method of skipping drive cycles, which means that the burst frequency can be determined based on the evaluation of only one burst period or based on the evaluation of two or more subsequent burst periods. Consequently, the frequency can be adjusted at the beginning of every new burst period or only after two or more burst periods until the burst frequency has decreased below the threshold. The frequency steps at which the clock frequency is reduced can be equal steps. According to another embodiment, these steps are dependent on a difference between the burst frequency and the burst frequency threshold, wherein the clock frequency is more reduced when there is a large difference than when there is a small difference, so that the magnitude of a frequency reduction step decreases with a decreasing difference between the burst frequency and the burst frequency threshold.

Referring to FIGS. 5 and 11, the clock generator 46, 46' can be a clock generator that is activated and deactivated by the deactivation signal provided by the burst mode control circuit. In this case, the output signal S46, S46' is only generated when the clock generator is activated. However, this is only one of several possible embodiments. According to a further embodiment, the clock generator 46, 46' is permanently activated and generates a clocked output signal; a logic gate, such as an AND gate, receives the output signal S46, S46' and allows the output signal S46, S46' to pass to the multiplexer 44 only when the activation signal $S50_2$ indicates that there is a burst-on period. This embodiment is illustrated in dotted lines in FIG. 11, where reference number 48 denotes the logic gate that receives the output signal S46, S46' the activation signal $S50_2$. In this embodiment, the clock generator 46, 46' only receives the frequency adjustment signal $S50_5$.

Besides adjusting the switching frequency during the burst-on period by, e.g., skipping clock pulses or adjusting the clock frequency of a clock generator, there is another way to adjust, particularly to reduce, the burst frequency. This will be explained with reference to FIGS. 12 to 14 in the following.

Figure 12:
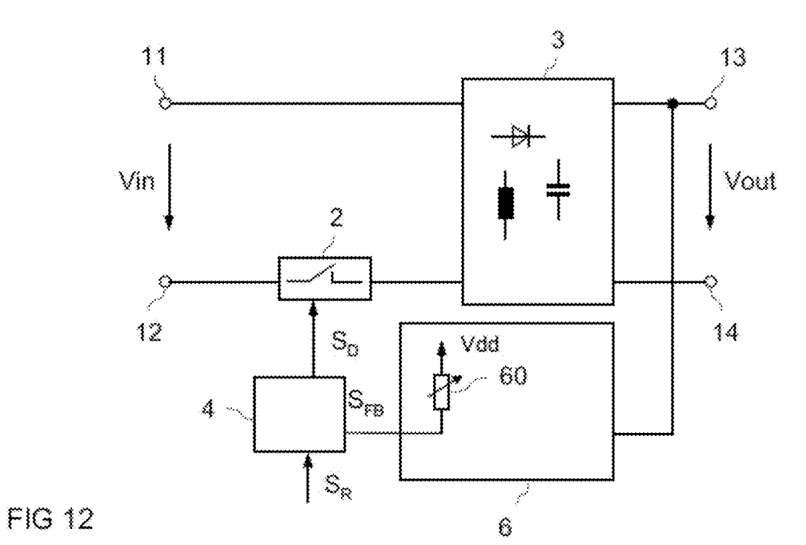
FIG. 12 illustrates a block diagram of a switching converter that includes a variable resistor for providing a feedback signal from an output voltage.

FIG. 12 schematically illustrates a block diagram of a switching converter with input terminals 11, 12, output terminals 13, 14, a switching element 2, a rectifier arrangement 3, a controller 4, and feedback circuit 6. The functionality of this switching converter corresponds to the functionality of the switching converter of FIG. 1, so that everything which has been explained concerning the switching converter of FIG. 1 applies to the switching converter of FIG. 12 accordingly.

In the switching converter of FIG. 12, the feedback circuit 6 includes a feedback resistor 60 connected between a terminal for a supply potential Vdd and the input of the controller 4. It can be shown that by varying a resistance value of this resistor 60 the burst frequency fb can be adjusted. Thus, resistor 60 is a variable resistor.

Figure 13:
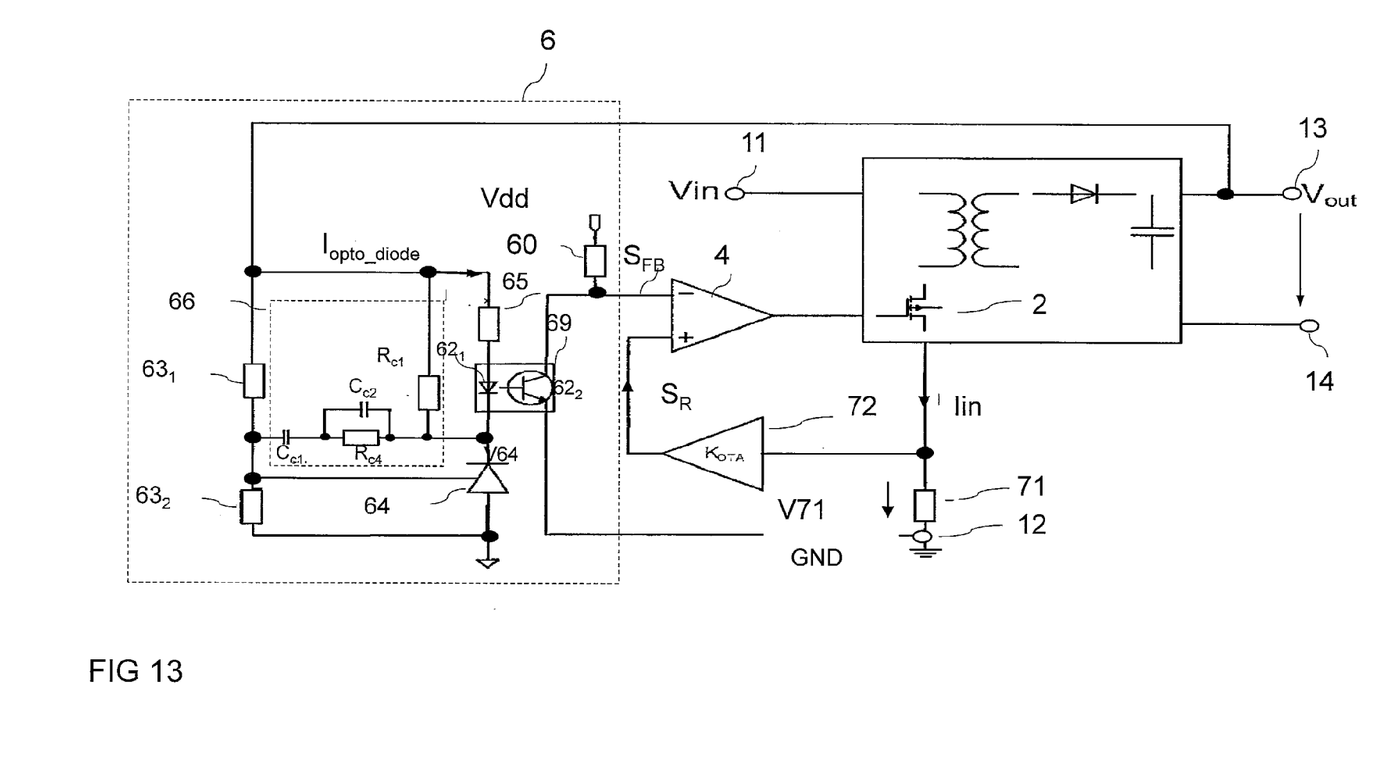
FIG. 13 illustrates in detail an embodiment of the switching converter of FIG. 10.

FIG. 13 illustrates an embodiment of the switching converter of FIG. 12 in detail. In this switching converter, the rectifier arrangement 3 is, for example, implemented as in the embodiment illustrated in FIG. 9, so that the switching converter is a flyback converter. In the switching converter of FIG. 13, the ramp signal $S_R$ is generated from the input current Iin by providing a sense resistor 71 through which the input current Iin flows, and by amplifying a voltage drop V71 across the sense resistor 71 using an amplifier 72, such as an operational amplifier. The ramp signal $S_R$ is available at the output of the amplifier 72. The output signal of the amplifier 72 is a ramp signal because the input current Iin of a flyback converter has a ramp waveform, what is commonly known. This ramp signal $S_R$ is received by the control circuit 4.

The feedback circuit 6 besides the variable resistor 60 includes an optocoupler 69 with a transmitter $62_1$ coupled to one of the output terminals and a receiver $62_2$ coupled to the feedback receiver 60 and the input of a controller 4. Specifically, the receiver $62_2$ is connected in series with the feedback resistor 60, where the series circuit with the feedback resistor 60 and the receiver $62_2$ is connected between a terminal for a supply potential Vdd and a terminal for a secondary side reference potential. The transmitter $62_1$ is, for example, a photodiode and the receiver $62_2$ is, for example, a light sensitive transistor.

In the normal operation mode of the switching converter of FIG. 13, a current $T_{opto-diode}$ through the photodiode is dependent on a difference between the output voltage Vout and a target voltage or set-voltage. For this, a regulator, in particular a PI regulator, is connected to one terminal of the photodiode $62_1$. The regulator provides an output voltage V64 which is dependent on the difference between the output voltage Vout and the set-voltage, wherein this voltage causes the current $T_{opto-diode}$ through the photodiode $62_1$ to flow.

In the embodiment of FIG. 13, the PI regulator includes a voltage regulator 64 connected in series with the photodiode $62_1$ and a resistor 65, where the series circuit with the regulator 64, the photodiode $62_1$, and the resistor 65 is connected between the output terminal and a primary side reference potential. The voltage regulator 64 is, for example, a shunt regulator, such as an integrated shunt regulator TL431 available from Fairchild Semiconductor Corporation. The voltage regulator provides its output voltage V64 at a circuit node common to the photodiode $62_1$ and the voltage regulator 64. An input of the voltage regulator 64 is coupled to the output terminals of the switching converter via a voltage divider with a first transistor $63_1$, a second transistor $63_2$. The circuit node common to voltage regulator 64 and the photodiode is coupled to the tap point of the voltage divider $63_1$, $63_2$ via an RC network 66. The RC network 66 includes a series circuit with a first capacitor $C_{c1}$ and a first resistor $R_{c4}$, and a second capacitor connected in parallel with the first resistor $R_{c4}$. Optionally, the RC network 66 includes a further resistor $R_{c1}$ connected in parallel with the photodiode $62_1$ and the resistor 65. In this PI regulator with the voltage regulator 64, the voltage divider $63_1$, $63_2$ and the RC network 66, the set voltage is a voltage which is internally generated in the voltage regulator. It should be noted that using a PI regulator as shown in FIG. 13 is only an example. One of many other PI regulator implementations may be used as well.

The phototransistor $62_2$ and the feedback resistor 60 generate the feedback signal $S_{FB}$ dependent on the current $I_{opto-diode}$ through the photodiode and, therefore, dependent on the voltage difference between the output voltage Vout and the set-voltage, so as to regulate the duty-cycle of the drive signal $S_D$ dependent on this voltage difference.

Figure 14:
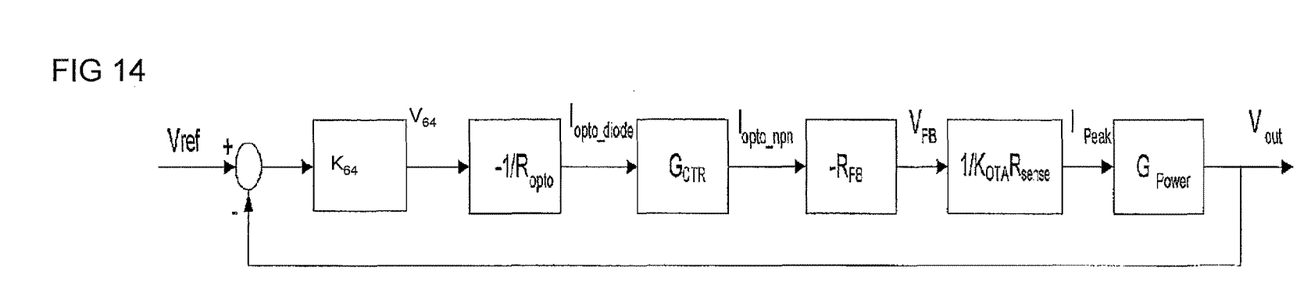
FIG. 14 shows a block diagram illustrating the control loop of the switching converter of FIG. 11.

FIG. 14 schematically illustrates the close loop block diagram of the switching converter of FIG. 12. In this diagram, Vref denotes the reference voltage for controlling the output voltage Vout of the switching converter. $K_{64}$ is the transfer function of the voltage regulator 64, $R_{opto}$ is the resistance value of resistor 65 connected in series with the photodiode, $G_{CTR}$ is the current transfer gain of the optocoupler 69, $I_{opto-diode}$ is the current through the photodiode, $I_{opto-npn}$ is the current through the transistor of the optocoupler 69, $R_{FB}$ is the resistance value of the feedback resistor 60, $K_{OTA}$ is the gain of the amplifier 72 amplifying the current measurement signal, $R_{sense}$ is the resistance value of the measurement resistor 71, and $G_{power}$ is the transfer gain of the power stage, where the power stage includes the switch 2.

The transfer function of the switching converter of FIGS. 10 and 11 can be expressed as follows:

$$G_v(s) = \frac{\left(1 + \frac{s}{2\pi f_{CZ}}\right)}{s(C_{C1}R_{C2})\left(1 + \frac{s}{2\pi f_{CP}}\right)} \cdot \frac{R_{FB} \cdot G_{CTR}}{R_{opto} \cdot K_{OTA} \cdot R_{FB}} \cdot \frac{V_{out}}{I_P} \cdot \frac{\left(1 + \frac{s}{2\pi f_Z}\right)}{\left(1 + \frac{s}{2\pi f_P}\right)} \quad (6)$$

where $f_{cz}$ is the control loop frequency at zero, $f_{cp}$ is the control loop frequency at the pole, $f_Z$ is the power stage frequency at zero, $f_P$ is the power stage frequency at the pole.

It can be seen from equation (6) that the resistance value $R_{FB}$ of the variable resistor 60 influences the gain of the control loop, wherein there is a direct close relationship between the gain and the burst frequency, wherein a smaller gain results in a smaller burst frequency fb. Thus, the burst frequency can be reduced when the resistance value $R_{FB}$ of the feedback resistor 60 is reduced. It should be noted that although equation (6) denotes the transfer function of a specific switching converter, the dependency of the transfer function on the resistance value $R_{FB}$ of the feedback resistor 60 is independent on the specific type of switching converter, so that the following explanation applies to every type of switching converter accordingly.

Figure 15:
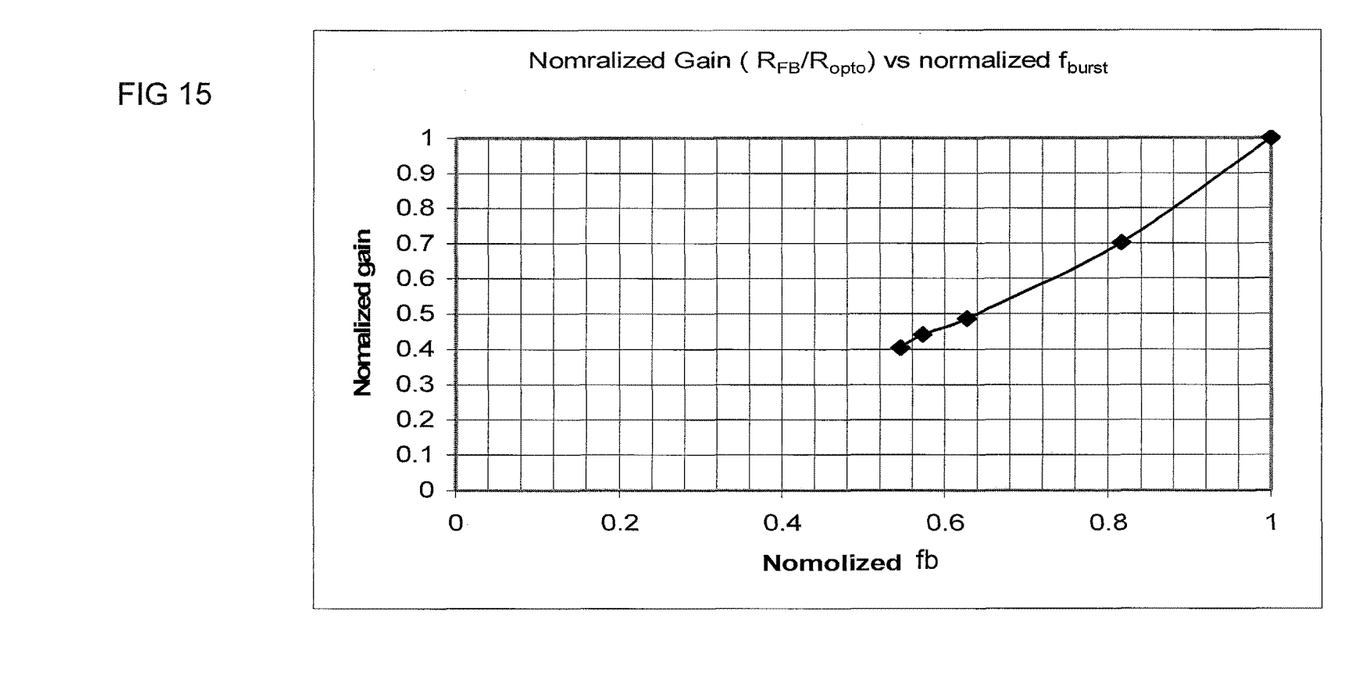
FIG. 15 illustrates the relationship between the gain of the control loop and the normalized burst frequency in the switching converters of FIGS. 11 and 12.

FIG. 15 schematically illustrates the relationship between the gain of the control loop and the burst frequency. In FIG. 15, a normalized gain is shown dependent on a normalized burst frequency. As can be seen from FIG. 15, the burst frequency reduces when the gain is reduced. Referring to equation (6), the burst frequency can, therefore, be reduced when reducing the gain by reducing the resistance value $R_{FB}$ of the feedback resistor 60.

Figure 16:
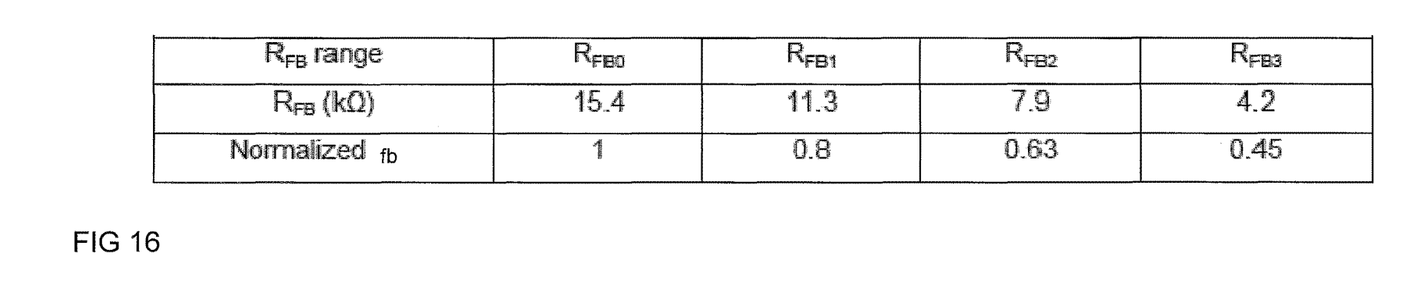
FIG. 16 shows a table in which a normalized burst frequency is shown dependent on a resistance value of a feedback resistor in the switching converters of FIGS. 11 and 12.

FIG. 16 shows a table in which the normalized burst frequency is shown dependent on a resistance value of the feedback resistor (in kΩ). In this embodiment, a variation of the resistance value of the feedback resistor between 15.4 kΩ and 4.2 kΩ, results in a variation of the normalized burst frequency between 1 and 0.45.

The resistance value of the feedback resistor 60 is, for example, adjusted by the burst-mode control circuit 50 illustrated in FIG. 5. This burst-mode control circuit 50 can be configured to select the number of drive cycles to be skipped and/or adjust the resistance value of the feedback resistor 60. Referring to FIG. 5, the burst-mode control circuit 50 may generate a resistance control signal $S50_4$ received by the variable resistor 60 (not shown in FIG. 5) in order to adjust the feedback resistance value $R_{FB}$.

Both methods, namely skipping or blanking out drive pulses and varying the feedback resistance can be used in combination in order to reduce the burst frequency fb in a very effective way.

Figure 17:
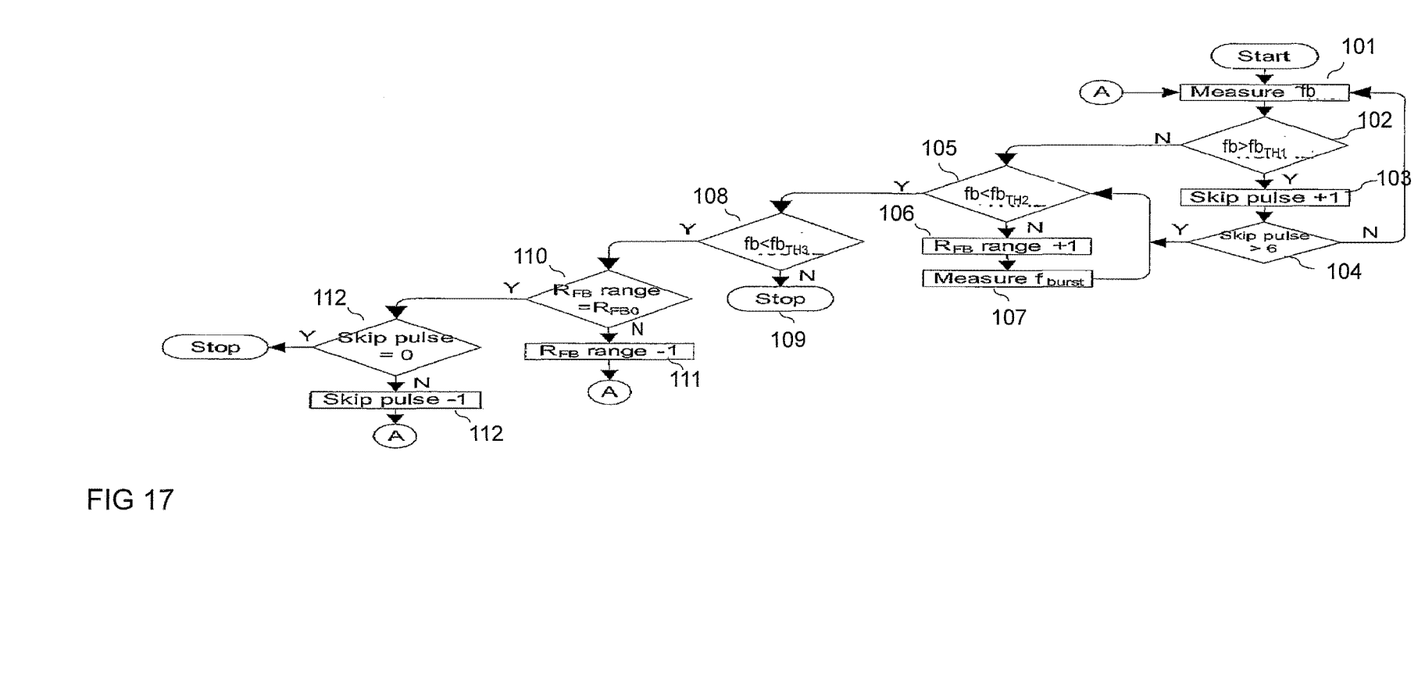
FIG. 17 illustrates a method for driving a switch in a switching converter, the method including varying a switching frequency and varying the resistance of a variable resistor.

FIG. 17 schematically illustrates a method in which skipping drive pulses and the variation of the feedback resistance are combined in order to adjust the burst frequency. For explanation purposes it is assumed that the initial burst frequency is above a first frequency threshold $fb_{TH1}$, which is, for example, about 1.8 kHz. In this method the burst frequency is measured at step 101 and the number x of drive pulses that are skipped is increased from burst cycle to burst cycle in steps 102, 103, 104 until the burst frequency is below the first frequency threshold $fb_{TH1}$ (see step 102) or until the number of pulses to be skipped has reached a maximum value (see step 104). In the embodiment of FIG. 17, the maximum number x of pulses that can be skipped is 6. The number x of drive pulses to be skipped can be adjusted from burst cycle to burst cycle, wherein one burst cycle includes a burst-on period and a burst-off period. According to another embodiment x is adjusted only after a number m of burst cycles, with m>1.

If the burst frequency fb is below the first frequency threshold $fb_{TH1}$ or if the maximum number of pulses to be skipped has been reached, the method proceeds at steps 105, 106, 107 in which the feedback resistance value $R_{FB}$ is increased until the burst frequency fb is below a second frequency threshold $fb_{TH2}$ that is below the first threshold $fb_{TH1}$. This first frequency threshold is, for example, 1 kHz. In this method, there is plurality of different resistance values, such as four different values $R_{FB0}$, $R_{FB1}$, $R_{FB2}$, or $R_{FB3}$ as shown in FIG. 13, wherein "$R_{FB}$ range+1" in step 106 means that the next smaller resistance value is chosen.

If the burst frequency fb is below the second threshold $fb_{TH2}$, the burst frequency is compared in step 108 with a third frequency threshold $fb_{TH3}$ which is below the second threshold $fb_{TH2}$. According to one embodiment, the third threshold is about 400 Hz. If the burst frequency fb is not below the third threshold $fb_{TH3}$, the method of adapting the burst frequency stops at step 109.

If, however, the burst frequency is also below the third threshold $fb_{TH3}$ it is desired to again increase the burst frequency. For this, the method proceeds at step 110 in which the feedback resistor $R_{FB}$ is evaluated. If the feedback resistor $R_{FB}$ has not the highest possible value ($R_{FB}=R_{FB0}$), the next higher resistance value is chosen at step 111 in order to increase the burst frequency and the method returns to step 101 at the beginning, where the burst frequency fb is measured.

If, however, the feedback resistor $R_{FB}$ has the highest possible value, the method proceeds at step 112 where the number x of pulses to be skipped is evaluated. If the number of pulses to be skipped is zero, the method stops, because neither the resistance $R_{FB}$ of the feedback resistor can be increased nor the number of skipped pulses can be reduced in order to again increase the burst frequency. If the number of pulses to be skipped is not zero, the method proceeds at step 112, where the number of skipped pulses is reduced, and the method returns to step 101 at the beginning.

It should be noted that in each of the methods explained hereinbefore, evaluating the burst frequency fb in order to adapt the number of skipped pulses and/or the resistance of the feedback resistor, requires at least one burst period, so that changes of the number of skipped pulses and/or of the resistance of feedback resistor may occur at a frequency that equals the current burst frequency or that is lower than the burst frequency.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method for driving a switching element in a switching converter providing an output voltage, the method comprising:
    generating, in a control loop, a feedback signal that is dependent on the output voltage;
    driving the switching element in a plurality of subsequent burst cycles, each burst cycle comprising a burst-on period and a subsequent burst-off period, wherein the switching element is switched on and off at least two times to produce two pulses at a switching frequency during the burst-on period and is off during the burst-off period;
    determining a burst frequency, wherein determining the burst frequency comprises evaluating a duration of at least one burst cycle;
    adjusting an effective switching frequency in at least one burst cycle dependent on the determined burst frequency;
    generating the feedback signal using a gain of the control loop;
    varying the gain of the control loop dependent on the determined burst frequency;
    reducing the effective switching frequency until the burst frequency is below a first threshold; and
    reducing the gain of the control loop until the burst frequency is below a second threshold that is lower than the first threshold.

2. The method of claim 1, further comprising, after reducing the gain of the control loop, increasing the switching frequency when the burst frequency is below a third frequency threshold that is below the second frequency threshold.

3. The method of claim 1, wherein the switching converter is a flyback converter.

4. A method for driving a switching element in a switching converter providing an output voltage, the method comprising:
    generating, in a control loop, a feedback signal that is dependent on the output voltage using a gain of the control loop;
    driving the switching element in a plurality of subsequent burst cycles, each burst cycle comprising a burst-on period and a subsequent burst-off period, wherein the switching element is switched on and off at least two times to produce two pulses at a switching frequency during the burst-on period and is off during the burst-off period;
    determining a burst frequency, wherein determining the burst frequency comprises evaluating a duration of at least one burst cycle; and
    varying a gain of the control loop dependent on the determined burst frequency, wherein the gain of the control loop is decreased when the burst frequency is above a given frequency threshold.

5. A controller for driving a switching element in a switching converter, the controller comprising:
    an input terminal for receiving a feedback signal;
    a first output terminal for providing a drive signal; and
    a second output terminal for adjusting a gain of a control loop;
    wherein the controller is configured to
        drive the switching element in a plurality of subsequent burst cycles, each burst cycle comprising a burst-on period and a subsequent burst-off period, wherein the switching element is switched on and off at least two times to produce two pulses at an effective switching frequency during the burst-on period and is off during the burst-off period,
        determine a burst frequency, wherein determining the burst frequency comprises evaluating a duration of at least one burst cycle,
        vary the gain of the control loop dependent on the determined burst frequency,
        reduce the effective switching frequency until the burst frequency is below a first threshold, and
        reduce the gain of the control loop until the burst frequency is below a second threshold that is lower than the first threshold.

6. The controller of claim 5, wherein the controller is configured to vary the gain of the control loop by varying a resistance value of a resistor.

7. The method of claim 1, wherein varying the gain of the control loop comprises varying a resistance of a variable resistor.

8. The method of claim 4, wherein varying the gain of the control loop comprises varying a resistance of a variable resistor.

* * * * *